(12) United States Patent
Sambongi

(10) Patent No.: US 12,259,400 B2
(45) Date of Patent: Mar. 25, 2025

(54) INFORMATION PROCESSING DEVICE, INFORMATION PROCESSING SYSTEM, AND INFORMATION PROCESSING METHOD

(71) Applicant: CASIO COMPUTER CO., LTD., Tokyo (JP)

(72) Inventor: Masao Sambongi, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 309 days.

(21) Appl. No.: 17/850,788

(22) Filed: Jun. 27, 2022

(65) Prior Publication Data

US 2023/0010822 A1   Jan. 12, 2023

(30) Foreign Application Priority Data

Jul. 12, 2021 (JP) ................... 2021-114717

(51) Int. Cl.
| | |
|---|---|
| G01P 13/00 | (2006.01) |
| G01C 22/00 | (2006.01) |
| G01P 21/00 | (2006.01) |
| G04G 21/02 | (2010.01) |

(52) U.S. Cl.
CPC .............. *G01P 13/00* (2013.01); *G01C 22/00* (2013.01); *G01P 21/00* (2013.01); *G04G 21/025* (2013.01)

(58) Field of Classification Search
CPC ......... G01P 13/00; G01P 21/00; G01C 22/00; G01C 21/16; G01C 22/006; G04G 21/025; G04G 9/007; G04G 21/02; G04G 21/04; A61B 5/1126; A61B 5/1121
USPC ........... 73/1.75, 1.79, 865.4; 702/33, 94, 95, 702/104, 127, 141, 142, 145, 147, 702/150–153, 154, 189; 600/520
See application file for complete search history.

(56) References Cited

U.S. PATENT DOCUMENTS

| | | | |
|---|---|---|---|
| 2009/0322763 A1* | 12/2009 | Bang .................... | G06V 40/23 |
| | | | 73/865.4 |
| 2013/0237882 A1 | 9/2013 | Niemimaki | |
| 2018/0153444 A1 | 6/2018 | Yang et al. | |

FOREIGN PATENT DOCUMENTS

JP    2013143996 A    7/2013

OTHER PUBLICATIONS

Chinese Office Action dated Jul. 23, 2024, issued in counterpart Chinese Application No. 202210785552.2.

* cited by examiner

*Primary Examiner* — Robert R Raevis
(74) *Attorney, Agent, or Firm* — Holtz, Holtz & Volek PC

(57) ABSTRACT

An information processing device includes at least one processor, in which the at least one processor acquires first information related to a first movement state of at least one of an arm and a leg of a user performing a movement, the first movement state on which a movement state of a torso of the user is superimposed, acquires second information related to a second movement state of the torso of the user performing the movement, and generates third information related to a third movement state of the at least one of the arm and the leg of the user based on the first information and the second information.

7 Claims, 8 Drawing Sheets

INFORMATION PROCESSING DEVICE, INFORMATION PROCESSING SYSTEM, AND INFORMATION PROCESSING METHOD

REFERENCE TO RELATED APPLICATIONS

The present application claims priority based on Japanese Patent Application No. 2021-114717 filed on Jul. 12, 2021, the entire contents of which are incorporated herein.

BACKGROUND

1. Technical Field

The present disclosure relates to an information processing device, an information processing system, and an information processing method.

2. Related Art

There is generally known a technique in which an electronic apparatus attached to the body of a user for use is provided with a detection unit configured to detect a movement state of the device, such as an acceleration sensor and an angular velocity sensor, and the movement state of the user is analyzed based on a detection result of the detection unit when the user is performing movement. For example, JP 2013-143996 A discloses a technique of analyzing a form of arm swing based on a detection result of a detection unit when a user runs in a state where an electronic apparatus is attached to the arm. By attaching the electronic apparatus to the leg, it is also possible to analyze the form of leg swing.

SUMMARY

An information processing device according to the present disclosure includes
at least one processor, in which
the at least one processor
acquires first information related to a first movement state of at least one of an arm and a leg of a user performing a movement, the first movement state on which a movement state of a torso of the user is superimposed,
acquires second information related to a second movement state of a torso of the user performing the movement, and
generates third information related to a third movement state of at least one of an arm and a leg of the user based on the first information and the second information.

An information processing system according to the present disclosure includes:
a first device including a first detection unit is used by being attached to at least one of an arm and a leg of a user, and configured to detect a movement state of the device;
a second device including a second detection unit attached to a torso of the user and used, and configured to detect a movement state of the device; and
at least one processor, in which
the at least one processor
acquires first information related to a first movement state of the at least one of an arm and a leg of the user on which a movement state of a torso of the user performing a movement is superimposed, the first information being generated based on a detection result of the first detection unit,
acquires second information related to a second movement state of a torso of the user performing the movement, the second information being generated based on a detection result of the second detection unit, and
generates third information related to a third movement state of the at least one of an arm and a leg of the user based on the first information and the second information.

An information processing method according to the present disclosure is an information processing method by a computer, the method including the steps of:
acquiring first information related to a first movement state of at least one of an arm and a leg of a user performing a movement, the first movement state on which a movement state of a torso of the user is superimposed;
acquiring second information related to a second movement state of a torso of the user performing the movement; and
generating third information related to a third movement state of at least one of an arm and a leg of the user based on the first information and the second information.

DETAILED DESCRIPTION

Figure 1:
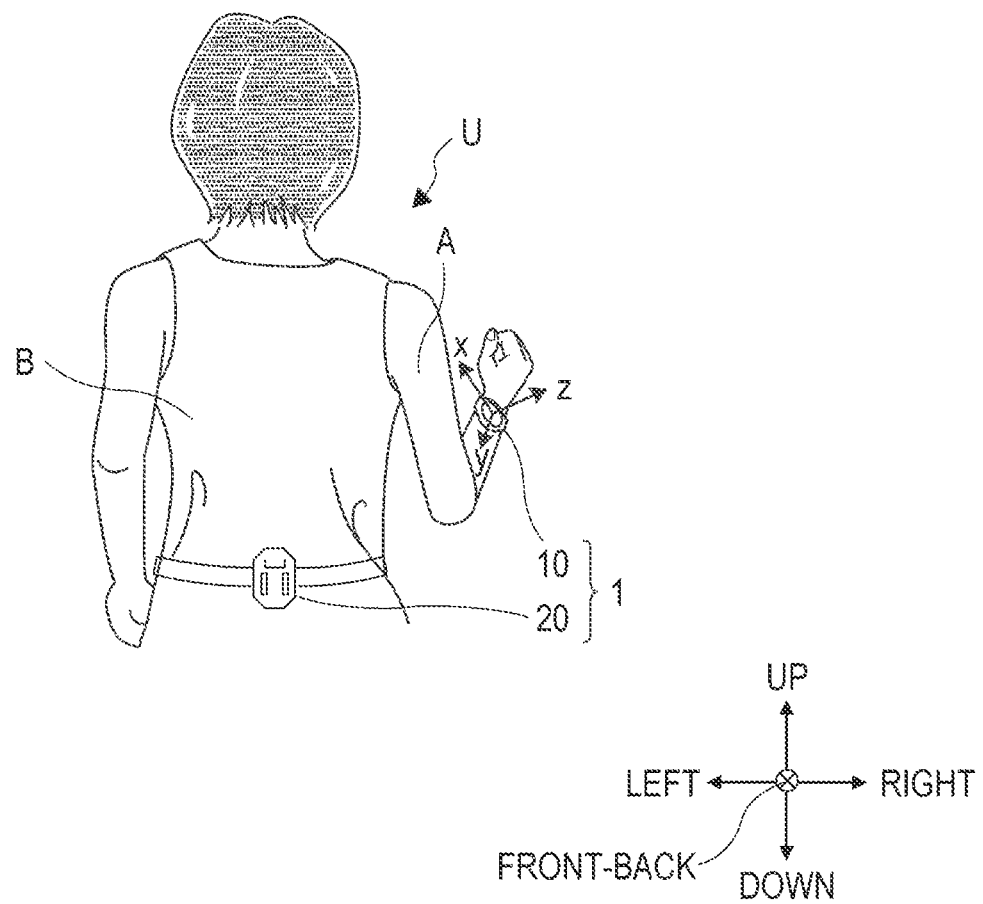
FIG. 1 is a diagram illustrating an information processing system.

An embodiment of the present disclosure will be described below with reference to the drawings.
<Outline of Information Processing System>
FIG. 1 is a diagram illustrating an information processing system 1 of the present embodiment. The information processing system 1 includes a first device 10 (information processing device) and a second device 20.

The first device 10 is used by being attached to an arm A of a user U in order to acquire information related to the movement state of the arm A. In FIG. 1, the first device 10 is attached to the wrist of the user U. The first device 10 of the present embodiment is a wristwatch. However, the present invention is not limited to this, and the first device 10 may be a discretionary wearable device (for example, a healthcare device such as an activity meter) other than a wristwatch, or may be an electronic apparatus that can be attached and fixed to the arm A such as a smartphone. The attachment position of the first device 10 is not limited to the wrist, and the first device 10 may be attached to a discretionary site of which the movement state is desired to be grasped, for example, an elbow or an upper arm.

The second device 20 is used by being attached to a torso B in order to acquire information related to the movement state of the torso B of the user U. The torso B is a part of the body excluding an arm (part from the shoulder joint to the front) and a leg (part from the hip joint to the front). In FIG. 1, the second device 20 is attached to the waist on the back side of the user U. It is preferable that the second device 20 is attached in the vicinity of the trunk in the torso B, that is, in the vicinity of a line passing through the spine. This is because the position change due to twist of the torso is small in the vicinity of the trunk, and the entire position and movement of the torso B easily appear. The second device 20 may be a dedicated wearable device for acquiring information related to the movement state of the torso B, or may be an electronic apparatus that can be attached and fixed to the torso B, such as a smartphone.

The user U performs movement in a state where the first device 10 and the second device 20 are attached. The type of movement is not particularly limited, but may involve travel of the user U, for example, walking or running. In the present embodiment, a case where the user U performs running will be described as an example. Hereinafter, a travel direction of the user U who is performing running is referred to as "front direction", a direction opposite to the travel direction is referred to as "rear direction", a gravity direction (vertically down direction) is referred to as "down direction", a direction opposite to the gravity direction (vertically up direction) is referred to as "up direction", a direction toward the right hand of the user U and perpendicular to both the front-rear direction and the up-down direction is referred to as "right direction", and a direction toward the left hand of the user U and perpendicular to both the front-rear direction and the up-down direction is referred to as "left direction".

A coordinate system having three axes of the front-rear direction, the up-down direction, and the right-left direction is referred to as "global coordinate system".

The first device 10 and the second device 20 are communicably connected by near field communication, and can transmit and receive data. Examples of near field communication include, but are not limited to, Bluetooth (registered trademark). Hereinafter, communicable connection between the first device 10 and the second device 20 by near field communication is also referred to as "pairing".

The first device 10 includes a first sensor unit 13 (first detection unit) (see FIG. 2) that detects the movement state of the device. Since the motion of the arm A attached with the first device 10 is interlocked with the motion of the torso B, the movement state (first movement state) of the arm A on which the movement state of the torso B is superimposed is reflected in the detection result of the first sensor unit 13. Based on the detection result of the first sensor unit 13, the first device 10 generates compound arm movement data 122 (see FIG. 2) as the first information related to the first movement state of the arm A on which the movement state of the torso B is superimposed. Hereinafter, the first movement state of the arm A on which the movement state of the torso B is superimposed is also referred to as "compound movement state".

The second device 20 includes a second sensor unit 23 (second detection unit) (see FIG. 3) that detects the movement state of the device. The movement state (second movement state) of the torso B of the user U is reflected in the detection result of the second sensor unit 23. The second device 20 generates and transmits, to the first device 10, torso movement data 123 (see FIG. 2) as the second information related to the second movement state of the torso B of the user U.

The first device 10 generates arm movement data 124 (third information) related to a single movement state (third movement state) of the arm A with reference to the torso B of the user based on a difference between the compound arm movement data 122 and the torso movement data 123 received from the second device 20. Hereinafter, the single third movement state of the arm A with reference to the torso B is also referred to as "single movement state". With the arm movement data 124, it is possible to grasp the movement state of the arm A itself excluding the movement state of the torso B. Based on the arm movement data 124, the first device 10 displays information related to the movement state of the arm A, for example, information related to a determination result of the arm swing state. An identification method of the single movement state of the arm A by the first device 10 will be described in detail later.

Note that the first device 10 may be capable of displaying various types of information related to the movement state of the user U in addition to the movement state of the arm A. For example, the first device 10 may be capable of displaying information such as a running distance, a running pace, a pitch (the number of steps per minute), a stride, a magnitude of up-down movement, a foot strike time per step, and a trunk inclination.

<Configuration of First Device>

Figure 2:
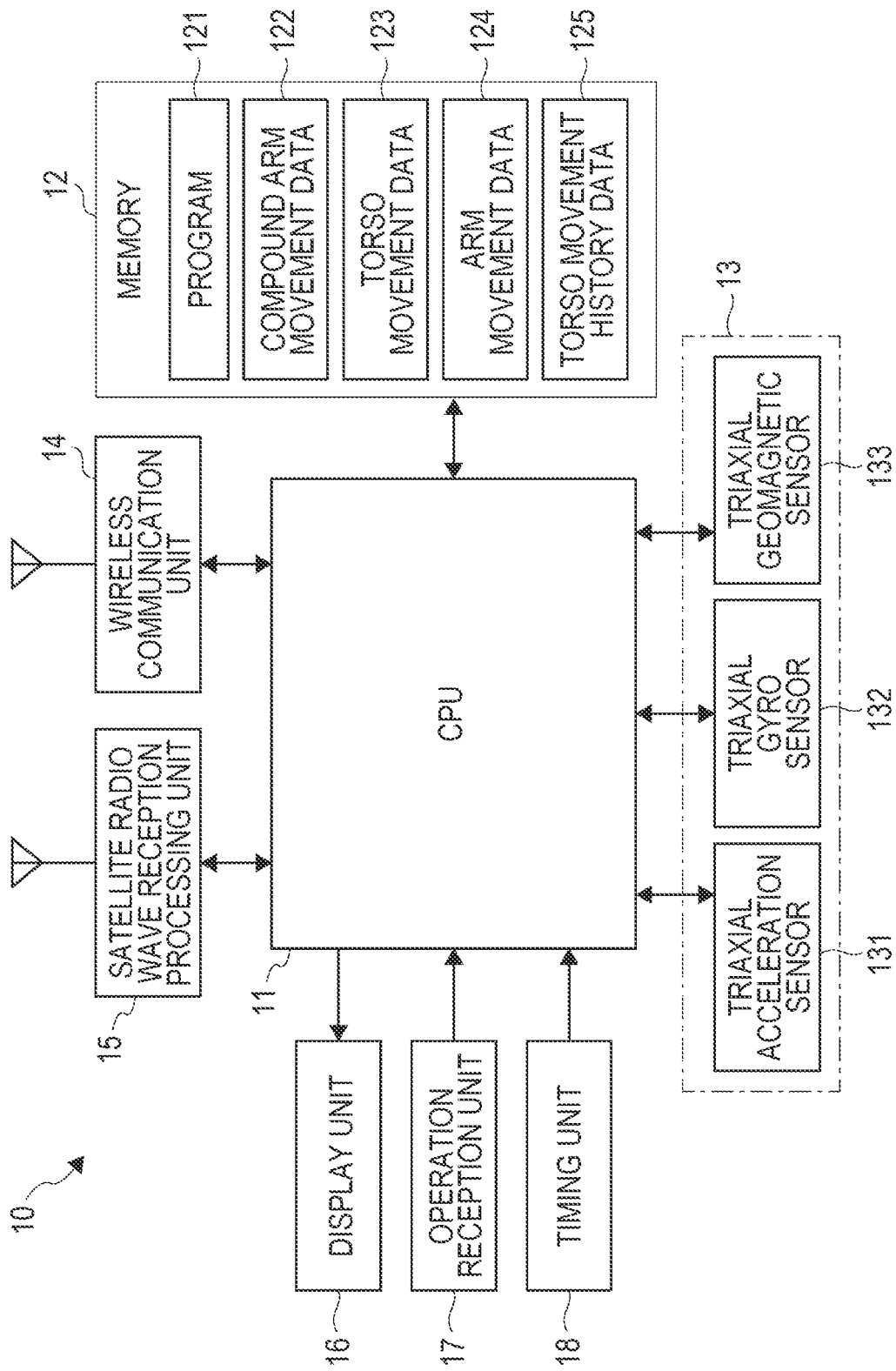
FIG. 2 is a block diagram illustrating a functional configuration of a first device.

FIG. 2 is a block diagram illustrating the functional configuration of the first device 10.

The first device 10 includes a central processing unit (CPU) 11, a memory 12 (storage unit), the first sensor unit 13, a wireless communication unit 14, a satellite radio wave reception processing unit 15, a display unit 16, an operation reception unit 17, and a timing unit 18.

By reading and executing a program 121 stored in the memory 12 and performing various types of arithmetic processing, the CPU 11 controls the action of each unit of the first device 10. In the present embodiment, the CPU 11 corresponds to "at least one processor". Note that the at least one processor may include two or more circuit elements such as a CPU that performs arithmetic processing.

The memory 12 is a non-transitory recording medium readable by the CPU 11 as a computer, provides a working memory space for the CPU 11, and stores various data. The memory 12 includes, for example, a random access memory (RAM) and a nonvolatile memory. The RAM is used for arithmetic processing of the CPU 11 and stores temporary data. The nonvolatile memory is, for example, a flash memory, and stores various data in addition to the program 121. The program 121 is stored in the memory 12 in the form of a computer-readable program code. The data stored in the memory 12 includes the compound arm movement data 122 (first information), the torso movement data 123 (second information), the arm movement data 124 (third information), and torso movement history data 125 (second information).

The compound arm movement data 122 is data generated based on the detection result of the first sensor unit 13, and is data indicating the compound movement state of the arm A on which the movement state of the torso B of the user U is superimposed. The torso movement data 123 is data indicating the movement state of the torso B of the user U received from the second device 20. The arm movement data 124 is data generated based on a difference between the compound arm movement data 122 and the torso movement data 123, and is data indicating the single movement state of the arm A with reference to the torso B of the user. The torso movement history data 125 is the torso movement data 123 generated at a past movement time of the user U. The arm movement data 124 may be generated based on a difference between the compound arm movement data 122 and the torso movement history data 125.

The first sensor unit 13 includes a triaxial acceleration sensor 131, a triaxial gyro sensor 132, and a triaxial geomagnetic sensor 133.

The triaxial acceleration sensor 131 detects, at a predetermined sampling frequency, acceleration in each axial direction applied to the first device 10 according to the movement of the user U, and outputs acceleration data as a detection result. The acceleration data output from the triaxial acceleration sensor 131 includes signal components for three axes (x axis, y axis, and z axis) orthogonal to one another. The orientations of the three axes are not particularly limited, but for example, as illustrated in FIG. 1, two axes perpendicular in a plane parallel to the display surface of the first device 10 can be the x axis and the y axis, and a direction perpendicular to the x axis and the y axis can be the z axis. Hereinafter, a coordinate system in which the positional relationship with the first device 10 is fixed, with the x axis, the y axis, and the z axis as three axes, is referred to as "sensor coordinate system".

The triaxial gyro sensor 132 detects, at a predetermined sampling frequency, an angular velocity around each axis applied to the first device 10 according to the movement of the user U, and outputs angular velocity data as a detection result. The angular velocity data output from the triaxial gyro sensor 132 includes signal components for the x axis, the y axis, and the z axis.

The triaxial geomagnetic sensor 133 detects, at a predetermined sampling frequency, an orientation of geomagnetism passing through the first device 10, and outputs geomagnetic data as a detection result. The geomagnetic data output from the triaxial geomagnetic sensor 133 includes signal components for the x axis, the y axis, and the z axis.

The sampling frequencies by the triaxial acceleration sensor 131, the triaxial gyro sensor 132, and the triaxial geomagnetic sensor 133 are determined to have a resolution capable of identifying the arm swing action, and are within a range of equal to or greater than 50 Hz and equal to or less than 200 Hz, for example. Detection timings by the triaxial acceleration sensor 131, the triaxial gyro sensor 132, and the triaxial geomagnetic sensor 133 will be referred to as "first detection timing" below. At each of the plurality of first detection timings, a first time stamp indicating the detection time is recorded and stored in association with each measurement data by the first sensor unit 13.

The first sensor unit 13 includes an amplifier (not illustrated) that amplifies analog signals output from the triaxial acceleration sensor 131, the triaxial gyro sensor 132, and the triaxial geomagnetic sensor 133, and an AD converter (not illustrated) that converts and outputs, to the CPU 11, the amplified analog signals into digital data.

The wireless communication unit 14 performs wireless communication with the second device 20, that is, transmission and reception of data using radio waves. In the present embodiment, the wireless communication unit 14 performs near field communication by Bluetooth with the second device 20 that is a pairing target.

The satellite radio wave reception processing unit 15 is a module that receives transmitted radio waves from a navigation satellite of a global navigation satellite system (GNSS), acquires GPS data, and calculates a current position and date and time based on this GPS data. The global navigation satellite system to be used is not particularly limited, but may be a quasi-zenith satellite system using, for example, a global positioning system (GPS), GLONASS, a quasi-zenith satellite "Michibiki", or the like. The satellite radio wave reception processing unit 15 calculates the current position and the date and time under the control of the CPU 11, and outputs the result to the CPU 11.

The display unit 16 displays various types of information related to the movement state, time, and the like under the control of the CPU 11. As the display unit 16, for example, a liquid-crystal display device that performs display in a dot matrix system can be used, but the present invention is not limited to this.

The operation reception unit 17 includes a plurality of operation buttons, and receives and outputs, to the CPU 11 as an input signal, a user's input operation (for example, a pressing operation) on the operation buttons. The CPU 11 executes processing corresponding to the function of the operation button with which the input operation has been performed. The operation reception unit 17 may have a touchscreen provided to be superimposed on the display screen of the display unit 16.

The timing unit 18 includes an oscillation circuit, a divider circuit, and a timing circuit. The timing unit 18 counts and holds the current date and time by the divider circuit dividing frequency of the clock signal generated by the oscillation circuit and by the clock circuit counting the divided signal.

<Configuration of Second Device>

Figure 3:
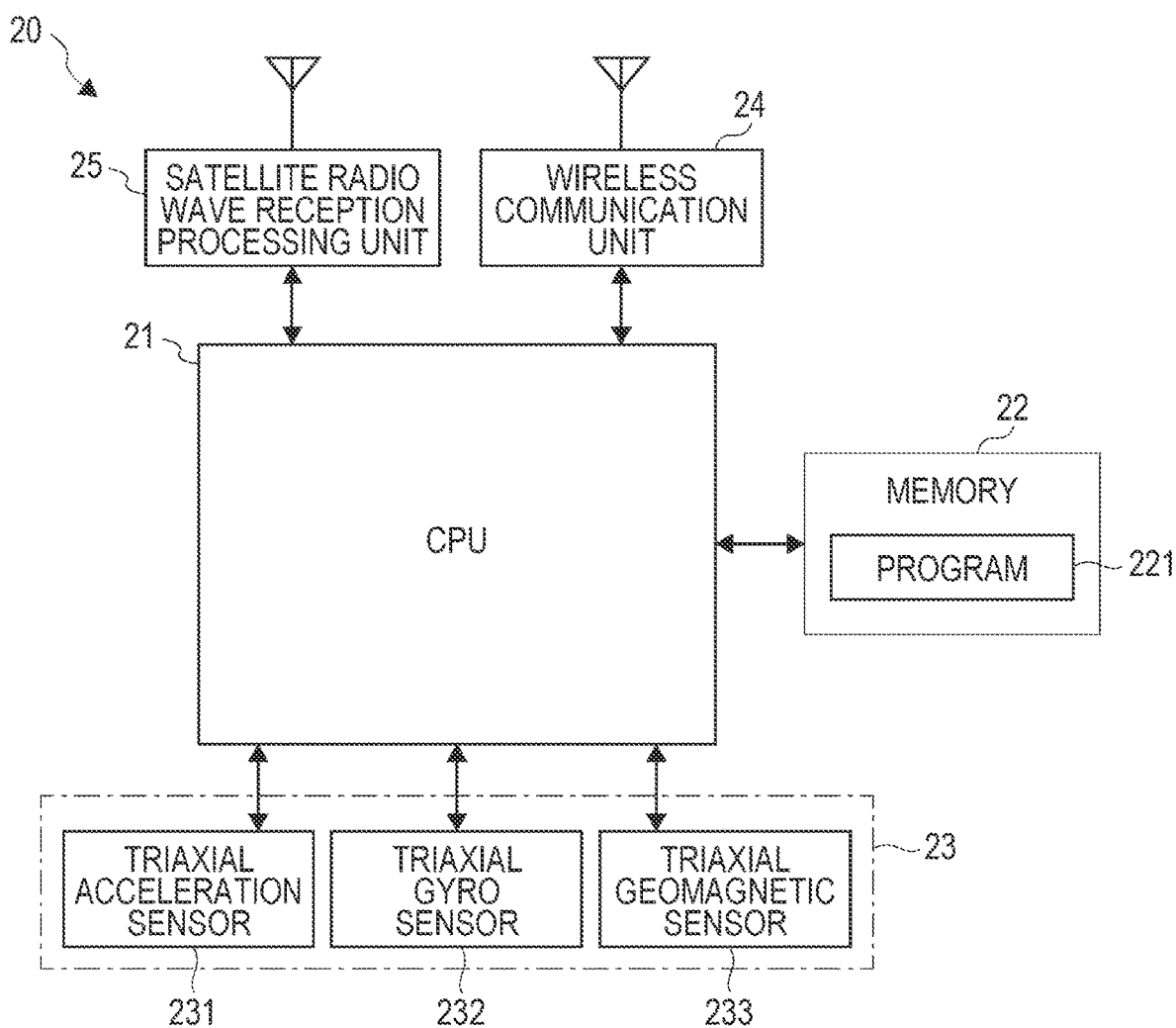
FIG. 3 is a block diagram illustrating a functional configuration of a second device.

FIG. 3 is a block diagram illustrating the functional configuration of the second device 20.

The second device 20 includes a CPU 21, a memory 22 (storage unit), the second sensor unit 23, a wireless communication unit 24, and a satellite radio wave reception processing unit 25.

By reading and executing a program 221 stored in the memory 22 and performing various types of arithmetic processing, the CPU 21 controls the action of each unit of the second device 20.

The memory 22 is a non-transitory recording medium readable by the CPU 21 as a computer, provides a working memory space for the CPU 21, and stores various data. The memory 22 includes, for example, a RAM and a nonvolatile memory. The RAM is used for arithmetic processing of the CPU 21 and stores temporary data. The nonvolatile memory is, for example, a flash memory, and stores various data in addition to the program 221. The program 221 is stored in the memory 22 in the form of a computer-readable program code.

The second sensor unit 23 includes a triaxial acceleration sensor 231, a triaxial gyro sensor 232, a triaxial geomagnetic sensor 233, an amplifier (not illustrated), and an AD converter (not illustrated). The configurations and actions of the triaxial acceleration sensor 231, the triaxial gyro sensor 232, and the triaxial geomagnetic sensor 233 are similar to the configurations and actions of the triaxial acceleration sensor 131, the triaxial gyro sensor 132, and the triaxial geomagnetic sensor 133 of the first device 10, respectively, and thus, description will be omitted. The sensor coordinate system in the triaxial acceleration sensor 231, the triaxial gyro sensor 232, and the triaxial geomagnetic sensor 233 of the second device 20 is independent of the sensor coordinate system in the triaxial acceleration sensor 131, the triaxial gyro sensor 132, and the triaxial geomagnetic sensor 133 of the first device 10. The sampling frequencies by the triaxial acceleration sensor 231, the triaxial gyro sensor 232, and the triaxial geomagnetic sensor 233 of the second device 20 may be different from the sampling frequencies by the triaxial acceleration sensor 131, the triaxial gyro sensor 132, and the triaxial geomagnetic sensor 133 of the first device 10, but by setting the sampling frequencies to be the identical to each other, the time resolution related to the analysis of the movement states of the arm A and the torso B can be made uniform. Detection timings (hereinafter, referred to as "second detection timing") by the triaxial acceleration sensor 231, the triaxial gyro sensor 232, and the triaxial geomagnetic sensor 233 of the second device 20 are preferably synchronized with first detection timings by the triaxial acceleration sensor 131, the triaxial gyro sensor 132, and the triaxial geomagnetic sensor 133 of the first device 10. At each of the plurality of second detection timings, a second time stamp indicating the detection time is recorded and stored in association with each measurement data by the second sensor unit 23.

The wireless communication unit 24 performs wireless communication with the first device 10, that is, transmission and reception of data using radio waves. In the present embodiment, the wireless communication unit 24 performs near field communication by Bluetooth with the first device 10 that is a pairing target.

The satellite radio wave reception processing unit 25 is a module that receives transmission radio waves from the navigation satellite of the global navigation satellite system, acquires GPS data, and calculates a current position and date and time based on this GPS data. The satellite radio wave reception processing unit 25 calculates the current position and the date and time under the control of the CPU 21, and outputs the result to the CPU 21. Note that any one of the satellite radio wave reception processing unit 15 of the first device 10 and the satellite radio wave reception processing unit 25 of the second device 20 may be omitted because their functions overlap with each other.

<Action of Information Processing System>

Next, the action of the information processing system 1 will be described focusing on an action related to identification of the movement state of the arm.

As described above, the movement state of the arm A identified by the first device 10 is not a single movement state with reference to the torso B (that is, in the coordinate axes fixed to the torso B) but a compound movement state on which the movement state of the torso B is superimposed. This is because the motion of the arm A is interlocked with the motion of the torso B, and the position, speed, and acceleration of the arm A are affected by the position, speed, and acceleration of the torso B. For example, in a case where the user U is performing running, the torso B is in a movement state corresponding to travel by running, and the position in the up-down direction cyclically changes and swings in the right-left direction.

Figure 4:
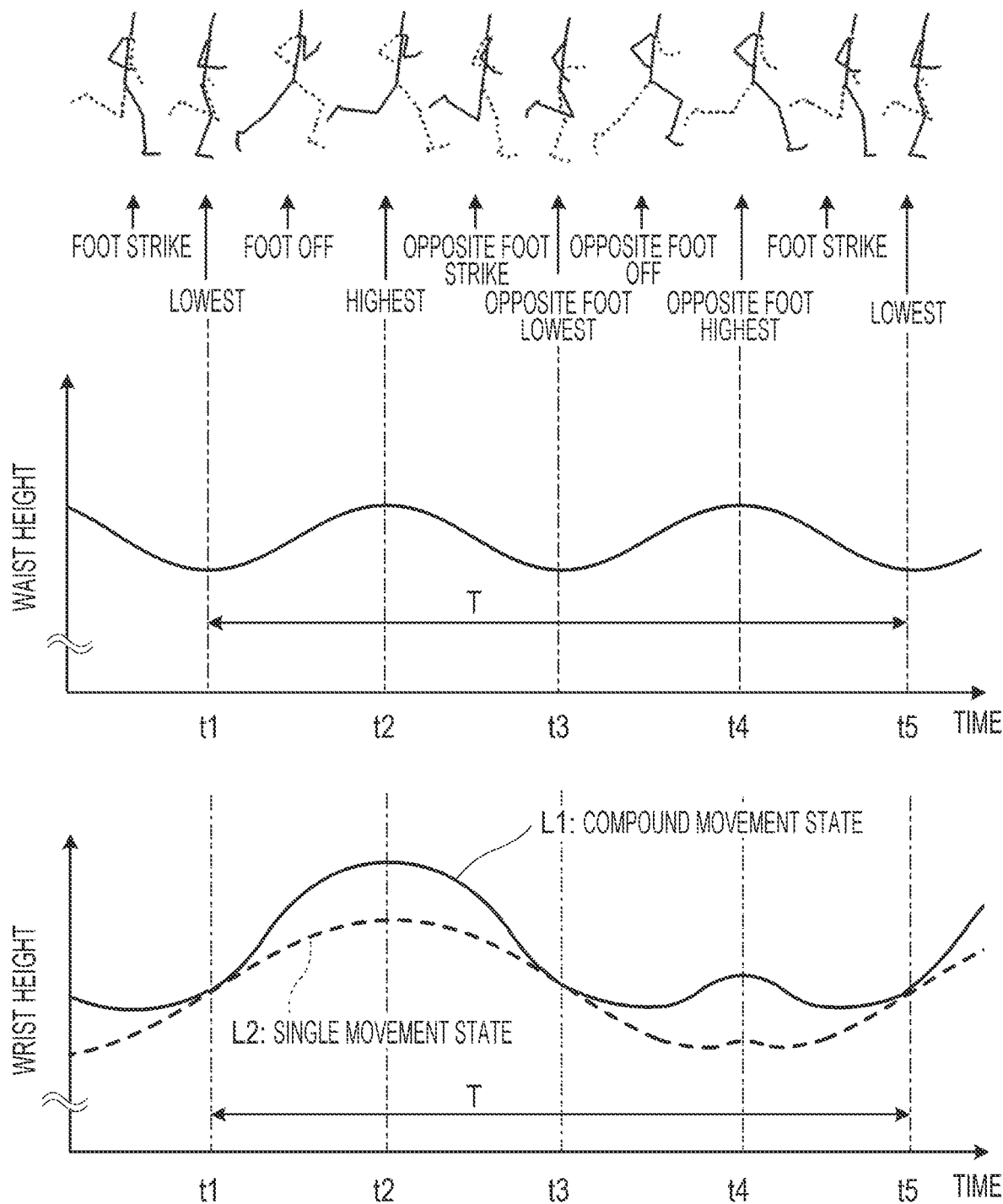
FIG. 4 is a diagram schematically illustrating an example of a movement state of a torso and an arm during running.

FIG. 4 is a diagram schematically illustrating an example of the movement state of the torso B and the arm A during running.

The upper part of FIG. 4 is a schematic diagram illustrating the action of the body of the user U at each time point of a movement cycle T during running. The middle part of FIG. 4 is a graph illustrating a variation in height in the up-down direction as one aspect of the movement state of the torso B (here, the waist attached with the second device 20) during running Here, the variation in the height of the torso B is schematically indicated by a sine curve. As seen from the schematic diagram in the upper part and the graph in the middle part, when the knee bends after the right leg strikes the ground, the position of the waist descends to the lowest point at time t1. Thereafter, the right leg is kicked out to be off the ground, and the height of the waist rises to the highest point in a state of floating in the air at time t2. Next, the knee bends after the left leg strikes the ground, and the position of the waist descends to the lowest point again at time t3. Next, the left leg is kicked out to be off the ground, and the height of the waist rises to the highest point again in a state of floating in the air at time t4. Next, the right leg strikes the ground, the knee bends, and the position of the waist descends to the lowest point at time t5. A period from time t1 to time t5 corresponds to the movement cycle T during running During running, the action of this movement cycle T is repeated. As illustrated in the middle part of FIG. 4, the height of the waist in the up-down direction changes so as to reciprocate twice between the lowest point and the highest point in synchronization with the motion of the leg in one movement cycle T.

In this manner, the torso B during running is in the movement state, and the movement state of this torso B is superimposed on the compound movement state of the arm A.

A solid line L1 in the lower part of FIG. 4 is a graph illustrating a variation in height in the up-down direction as one aspect of the compound movement state of the arm A (here, the wrist attached with the first device 10) during running. A broken line L2 in the lower part of FIG. 4 is a graph illustrating a variation in height in the up-down direction as one aspect of the single movement state of the arm A with respect to the torso B. As indicated by the broken line L2, the height of the arm A in the single movement state increases in accordance with the action of raising the arm A in the front direction from time t1 to time t2, decreases in accordance with the action of pulling the arm A in the rear direction from time t2 to time t4, forms a small peak of a slight increase when completely pulling the arm A around time t4, and thereafter increases in accordance with the action of returning the arm A to the front direction again around time t5. Even if the variation in the height of the arm A in the single movement state is as indicated by the broken line L2, the variation in the height of the torso B in the movement state is superimposed, so that the variation in the height of the arm A in the compound movement state draws a waveform as indicated by the solid line L1 different from that of the broken line L2. The movement state of the arm A identified by the first device 10 attached to the arm A is the compound movement state indicated by the solid line L1, and the single movement state of the arm A indicated by the broken line L2 cannot be identified and analyzed only from the detection result of the first sensor unit 13 of the first device 10.

Methods of extracting the single movement state from the compound movement state of the arm A include a method of identifying and subtracting, from the compound movement state of the arm A, an average torso movement state at the time of running of a large number of runners. However, since such average torso movement state is not necessarily approximated to the movement state of the torso B of the user U, it is difficult to accurately identify the single movement state of the arm A.

Therefore, in the information processing system 1 of the present embodiment, the second device 20 identifies the movement state of the torso B of the user U in real time, and identifies the single movement state of the arm A based on the difference between the compound movement state of the arm A identified by the first device 10 and the movement state of the torso B. Specifically, based on the detection result by the second sensor unit 23, the second device 20 generates and transmits, to the first device 10, the torso movement data 123 related to the movement state of the torso B of the user U. Based on the detection result by the first sensor unit 13, the first device 10 generates the compound arm movement data 122 related to the compound movement state of the arm A of the user U. Then, based on the difference between the compound arm movement data 122 and the torso movement data 123, the first device 10 generates the arm movement data 124 related to the single movement state of the arm A.

According to this method, since it is possible to subtract the movement state of the torso B of the user U himself from the compound movement state of the arm A, it is possible to identify the single movement state of the arm A with high accuracy.

For example, in a case where the torso movement data 123 includes data indicating the variation in the height of the waist illustrated in the middle part of FIG. 4 and the compound arm movement data 122 includes data indicating the variation in the height of the wrist in the compound movement state illustrated by the solid line L1 in the lower part of FIG. 4, the arm movement data 124 indicating the variation in the height of the wrist in the single movement state illustrated by the broken line L2 in the lower part of FIG. 4 can be acquired by subtracting the height of the waist at each time point of the torso movement data 123 from the height of the wrist at each time point of the compound arm movement data 122. In a case where the compound arm movement data 122 and the torso movement data 123 include time-series data, the above-described first time stamp indicating the time point is associated with the data at each time point of the compound arm movement data 122, and the above-described second time stamp indicating the time point is associated with the data at each time point of the torso movement data 123. Then, with reference to the first time stamp and the second time stamp, the difference between data at corresponding timings among the compound arm movement data 122 and the torso movement data 123 is calculated, and the arm movement data 124 is generated.

Although the variation in the height is illustrated in FIG. 4, the information included in the compound arm movement data 122 and the arm movement data 124 is not particularly limited as long as it indicates the movement state of the arm A. For example, information may be related to a swing width W1 of the arm A in the front-back direction illustrated in FIG. 5 or the track of the arm swing in the front-back direction, or information may be related to a swing width W2 in the up-down direction or the track of the arm swing in the up-down direction (corresponding to the solid line L1 and the broken line L2 in the lower part of FIG. 4). Information on the swing width in the right-left direction or the track of the arm swing in the right-left direction may be included. The information is not limited to information related to the position of the arm A (first device 10), and may be information related to the speed, acceleration, or the like of the arm A.

Similarly, the information included in the torso movement data 123 is not particularly limited as long as it indicates the movement state of the torso B. For example, the information may be related to the variation track (corresponding to the middle part of FIG. 4) or a change width of the position in the up-down direction of the torso B, or may be related to the variation track or a change width of the position in the right-left direction. The information is not limited to information related to the position of the torso B (second device 20), and may be information related to the speed, acceleration, or the like of the torso B.

In preparation for a case where the real-time torso movement data 123 cannot be received from the second device 20 due to various factors, the torso movement data 123 received by the first device 10 may be stored in the memory 12 as the torso movement history data 125. Examples of the case where the real-time torso movement data 123 cannot be received include a case where pairing between the first device 10 and the second device 20 is released or detection by the second sensor unit 23 cannot be performed due to a failure of the second device 20 for some reason (for example, short circuit of the circuit), battery exhaustion (output voltage of the battery becomes equal to or lower than a threshold due to discharge) of the second device 20, or the like, and a case where the user does not (or cannot) attach the second device 20. By storing the torso movement data 123 into the memory 12 as the torso movement history data 125, even in a case where the real-time torso movement data 123 cannot be received from the second device 20, the arm movement data 124 can be generated by using the torso movement history data 125 in place of the torso movement data 123. That is, the arm movement data 124 may be generated based on a difference between the compound arm movement data 122 related to the movement state of the arm A of the user U in a certain first period and the torso movement history data 125 related to the movement state of the torso B of the user U in a second period prior to the first period. Although the torso movement history data 125 does not reflect the real-time movement state of the torso B, it indicates the movement state of the torso B of the user U himself, and thus, it is possible to identify the single movement state of the arm A with high accuracy as compared with the method of subtracting the average value of a large number of runners.

Figure 6:
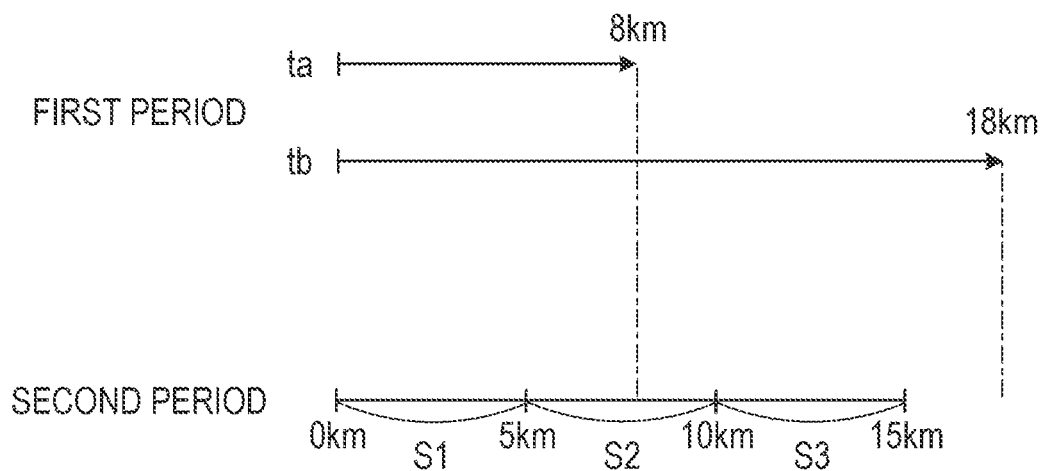
FIG. 6 is a diagram illustrating an example of a plurality of sections in a movement involving travel.

In the second period (for example, at the time of running performed in the past), the torso movement data 123 related to the movement state of the torso B may be acquired and stored as the torso movement history data 125 in each of the plurality of sections obtained by dividing the travel path after the travel is started. For example, as illustrated in FIG. 6, in a case of performing running for 15 km in the second period, the travel path may be divided into sections S1 to S3 every 5 km, and the torso movement history data 125 may be stored in each of the sections S1 to S3. The travel distance of the user U is only required to be calculated from a result of positioning by the satellite radio wave reception processing unit 15 of the first device 10 or the satellite radio wave reception processing unit 25 of the second device 20. The length of the section is not limited to 5 km, and can be appropriately determined according to the purpose of analysis or the like. In place of the travel distance from the travel start, sections may be divided according to the elapsed time from the travel start.

In a case where the torso movement history data 125 is stored for each section, it is only required to identify to which section among the plurality of sections the travel distance after the movement of the user U is started in the first period (for example, the current running time) belongs, and generate the arm movement data 124 based on the difference between the compound arm movement data 122 and the torso movement history data 125 corresponding to the identified section. In the example of FIG. 6, in the first period, the travel distance up to time ta is 8 km and belongs to the section S2. Therefore, at time ta, the arm movement data 124 is generated based on the difference between the compound arm movement data 122 and the torso movement history data 125 corresponding to the section S2. According to this method, even in a case where the running form (the movement state of the torso B) changes due to fatigue or the like according to the running distance, the movement state of the torso B reflecting the change can be subtracted from the compound movement state of the arm A. Therefore, it is possible to identify the single movement state of the arm A more accurately.

In a case where the travel distance of the user U in the first period is longer than the entirety of the plurality of sections for which the torso movement history data 125 has been stored, the arm movement data 124 may be generated based on the difference between the compound arm movement data 122 and the torso movement history data 125 corresponding to the final section among the plurality of sections. In the example of FIG. 6, in the first period, the travel distance up to time tb is 18 km, which is longer than the entire section (15 km) for which the torso movement history data 125 is stored. Therefore, the arm movement data 124 can be generated using the torso movement history data 125 in the section S3, which is the final section.

Note that, in place of the section or together with the section, course information related to the state of the course where the user U has performed running may be recorded, and the torso movement history data 125 may be stored for each part of the course where the content of the course information is different. Examples of the state of the course indicated by the course information include a gradient of the course (climbing road or downhill road), a way of turning the course (straight road or curved road), a surface state of the course (asphalt, soil, degree of unevenness, wet or not, presence or absence of freezing), a wind direction, and a wind speed. The movement state of the torso B and the relationship in motion between the arm A and the torso B can change also depending on the state of these courses (external factors). Therefore, by identifying the state of the course in the first period and generating the arm movement data 124 using the torso movement history data 125 stored in association with the identified state, it is possible to identify the single movement state of the arm A more accurately.

Next, in order to identify the single movement state of the arm A as described above, the torso movement detection processing executed in the second device 20 and the arm movement detection processing executed in the first device 10 will be described.

Figure 7:
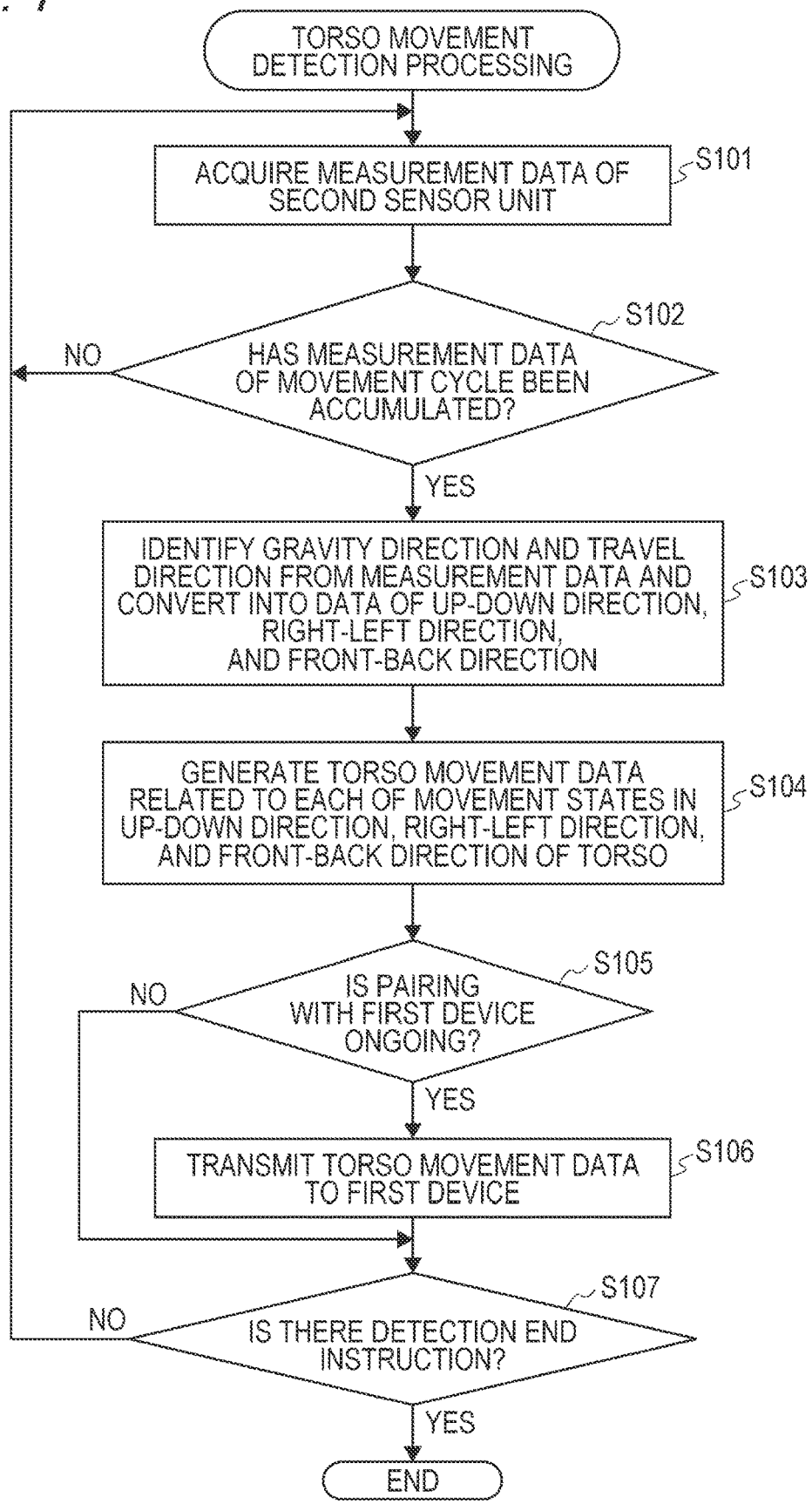
FIG. 7 is a flowchart illustrating a control procedure of torso movement detection processing.

FIG. 7 is a flowchart illustrating the control procedure by the CPU 21 of the torso movement detection processing. The torso movement detection processing is started in a case where a predetermined processing start signal is received from the paired first device 10, for example.

When the torso movement detection processing is started, the CPU 21 of the second device 20 acquires measurement data (detection result) of the second sensor unit 23 (step S101). Here, by the triaxial acceleration sensor 231, the triaxial gyro sensor 232, and the triaxial geomagnetic sensor 233, the CPU 21 acquires measurement data detected at a predetermined sampling frequency and at the second detection timing synchronized with the first detection timing by the first sensor unit 13. The CPU 21 stores the acquired measurement data into the memory 22 in association with the second time stamp indicating the second detection timing of the measurement data.

The CPU 21 determines whether or not measurement data for the movement cycle T has been accumulated (step S102). The determination method in step S102 is not particularly limited, but for example, a method of determining based on a peak included in the detection result of the triaxial acceleration sensor 231 can be used. Since a peak corresponding to the strike of the leg on the ground occurs in the acceleration detected by the triaxial acceleration sensor 231, it can be determined that the measurement data for the movement cycle T is accumulated in a case where two peaks corresponding to the strike for two steps have been detected. That is, the measurement data from the peak corresponding to the foot strike to the peak two peaks after the peak can be identified as measurement data for the movement cycle T. In a case where it is determined that the measurement data for the movement cycle T has not been accumulated ("NO" in step S102), the CPU 21 returns the processing to step S101.

In a case where it is determined that the measurement data for the movement cycle T has been accumulated ("YES" in step S102), the CPU 21 identifies the gravity direction and the travel direction from the measurement data of the second sensor unit 23, and converts the measurement data into data in the up-down direction, the right-left direction, and the front-rear direction (step S103). Here, the CPU 21 identifies the gravity direction (down direction) based on the gravity direction detected by the triaxial acceleration sensor 231 and/or the geomagnetic direction detected by the triaxial geomagnetic sensor 233. The CPU 21 identifies the travel direction (front direction) of the user U based on the identified gravity direction and the magnitude of the acceleration of each axis of the triaxial acceleration sensor 231. The CPU 21 converts (separates) the measurement data in the sensor coordinate system of the second sensor unit 23 into measurement data in the global coordinate system having the up-down direction, the right-left direction, and the front-rear direction as coordinate axes.

Based on the measurement data of the movement cycle T of the second sensor unit 23, the CPU 21 generates the torso movement data 123 related to each movement state in the up-down direction, the right-left direction, and the front-rear direction of the torso B (step S104). For example, the CPU 21 calculates data related to a predetermined index indicating the movement state of the torso B in the up-down direction, the right-left direction, and the front-rear direction. Here, the index indicating the movement state can be appropriately determined according to the purpose of analysis of the movement state and the like. Examples of the index include, in addition to the variation track of the torso B in the up-down direction indicated in the middle part of FIG. 4, a change width of the position in the up-down direction, a variation track or a change width of the position in the right-left direction, transition of the rotation angle around the trunk, and transition of the inclination angle of the trunk. The index is not limited to an index indicated by the position and angle of the torso B, and may be an index indicated by the speed, acceleration, or the like of the torso B. The position data of the torso B can be acquired by integrating acceleration measurement data twice, and the speed data can be acquired by integrating acceleration measurement data once. The rotation angle about each axis can be acquired by integrating the angular velocity. Note that in a case where the measurement data of the second sensor unit 23 includes a twist (rotation) action about the trunk (rotation axis) of the torso B, the torso movement data 123 may be generated based on data obtained by subtracting the twist action in advance. Due to this, the torso movement data 123 indicating the movement state of the site (for example, trunk) indicating the entire torso B is obtained. The data at each time point of the torso movement data 123 is stored in association with the second time stamp indicating the time point.

The CPU 21 determines whether or not pairing with the first device 10 is ongoing (that is, whether or not communication connection is on) (step S105). In a case where it is determined that pairing is ongoing ("YES" in step S105), the CPU 21 transmits the torso movement data 123 (including the second time stamp) generated in step S104 to the first device 10 (step S106).

In a case where step S106 ends, or in a case where it is determined in step S105 that pairing with the first device 10 is not ongoing (communication connection is off) ("NO" in step S105), the CPU 21 determines whether or not an instruction to end detection of the movement state of the torso B has been made (step S107). The instruction may be an operation of instructing end of detection, an operation of instructing power-off, or the like by the user U. Alternatively, in a case where end of the movement of the user U is detected based on the detection result by the second sensor unit 23, it may be regarded that an instruction to end the detection is made. In a case where it is determined that the instruction to end the detection of the movement state of the torso B has not been made ("NO" in step S107), the CPU 21 returns the processing to step S101, and in a case where it is determined that the instruction to end the detection of the movement state of the torso B has been made ("YES" in step S107), the CPU ends the torso movement detection processing.

Figure 8:
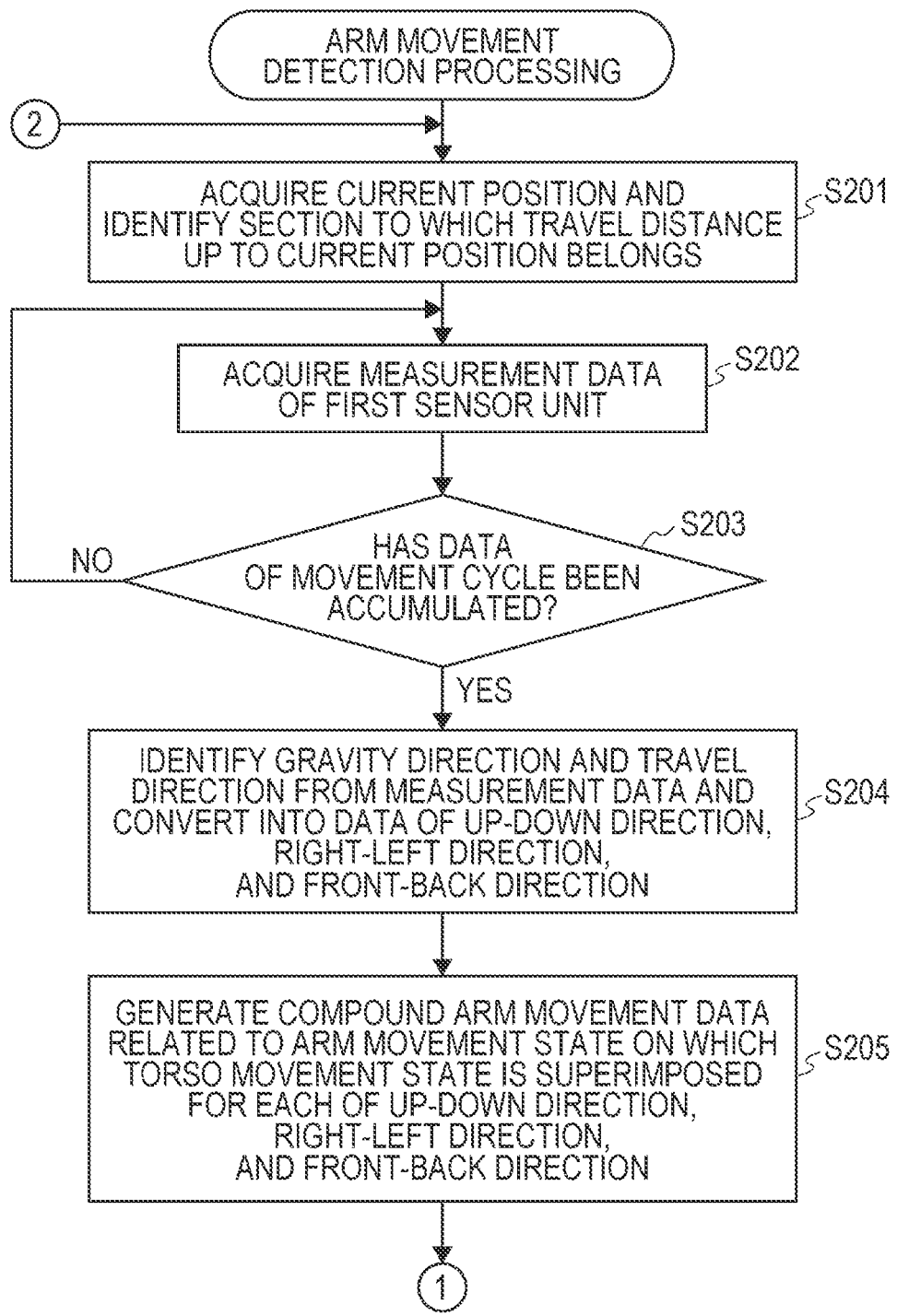
FIG. 8 is a flowchart illustrating a control procedure of arm movement detection processing.
Figure 9:
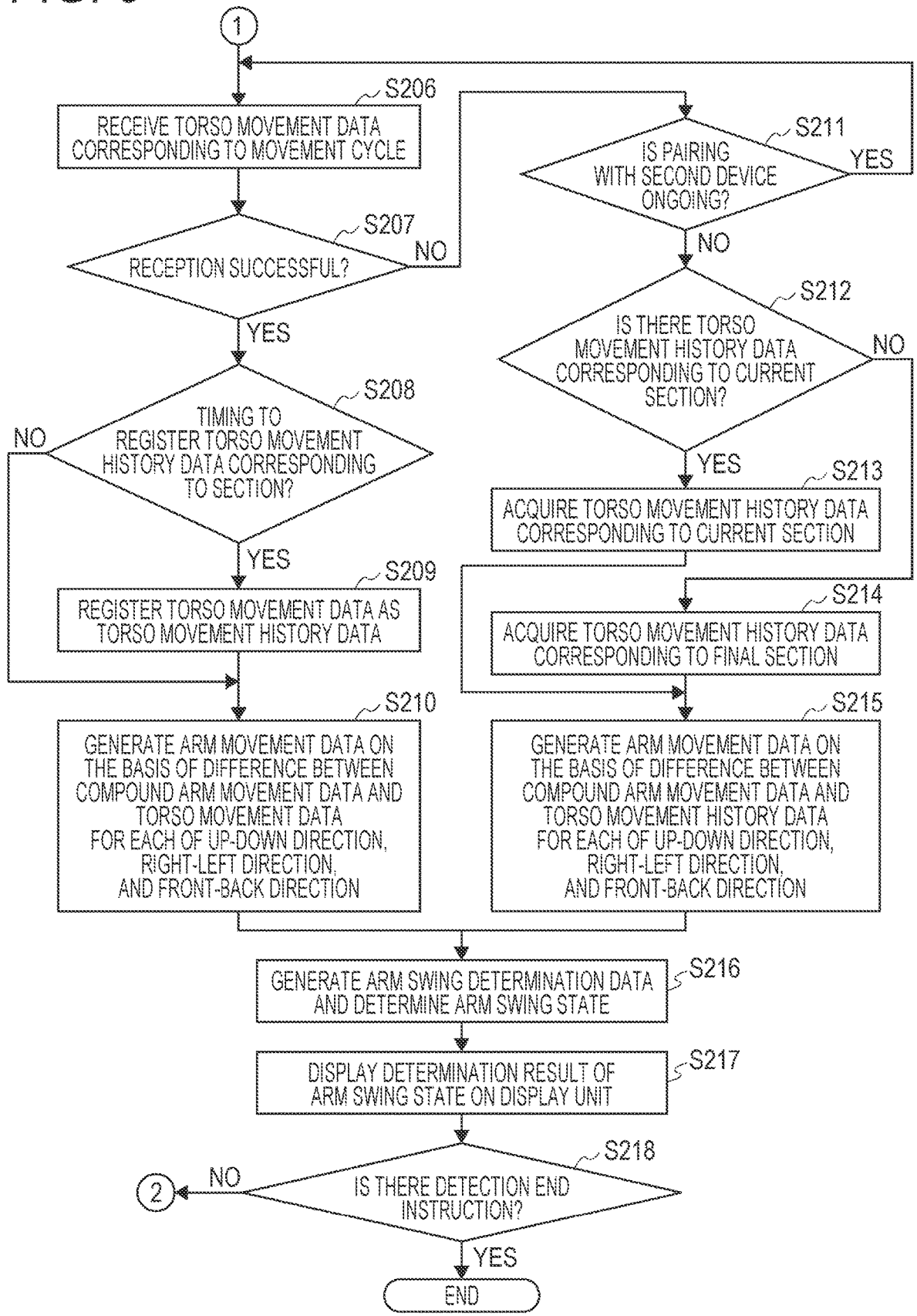
FIG. 9 is a flowchart illustrating a control procedure of arm movement detection processing.

FIGS. 8 and 9 are flowcharts illustrating the control procedure by the CPU 11 of the arm movement detection processing.

The arm movement detection processing is started in a case where, for example, the user U performs an operation of instructing the start of movement measurement. When the arm movement detection processing is started, the CPU 11 of the first device 10 acquires the current position calculated by the satellite radio wave reception processing unit 15, and identifies the section (for example, any of the sections S1 to S3 in FIG. 6) to which the travel distance from the movement start position to the current position belongs (step S201). Alternatively, the current position may be identified by receiving the current position acquired by the satellite radio wave reception processing unit 25 of the second device 20.

The CPU 11 acquires measurement data (detection result) of the first sensor unit 13 (step S202). Here, the CPU 11 acquires measurement data detected by the triaxial acceleration sensor 131, the triaxial gyro sensor 132, and the triaxial geomagnetic sensor 133 at the identical sampling frequency to that of the second sensor unit 23 of the second device 20 and at the first detection timing synchronized with the second detection timing by the second sensor unit 23. The CPU 11 stores the acquired measurement data into the memory 12 in association with the first time stamp indicating the first detection timing of the measurement data.

The CPU 11 determines whether or not measurement data for the movement cycle T has been accumulated (step S203). Determination in step S203 can be performed by a method similar to the determination in step S102 of the torso movement detection processing. Also here, the measurement data from the peak of the acceleration corresponding to foot strike to the peak two peaks after the peak can be identified as measurement data for the movement cycle T. In a case where it is determined that the measurement data for the movement cycle T has not been accumulated ("NO" in step S203), the CPU 11 returns the processing to step S202.

In a case where it is determined that the measurement data for the movement cycle T has been accumulated ("YES" in step S203), the CPU 11 identifies the gravity direction and the travel direction from the measurement data of the first sensor unit 13, and converts the measurement data into data in the up-down direction, the right-left direction, and the front-rear direction (step S204). Here, the CPU 11 identifies the gravity direction and the travel direction by the method similar to that in step S103 of the torso movement detection processing, and converts them into measurement data of the global coordinate system.

The CPU 11 generates the compound arm movement data 122 related to the compound movement state of the arm A on which the movement state of the torso B is superimposed for each of the up-down direction, the right-left direction, and the front-back direction of the arm A based on the measurement data of the movement cycle T of the first sensor unit 13 (step S205). For example, the CPU 11 calculates data related to a predetermined index indicating the compound movement state of the arm A in the up-down direction, the right-left direction, and the front-back direction. Here, the index indicating the compound movement state can be appropriately determined according to the purpose of analysis of the movement state and the like. Examples of the index include, in addition to the variation track of the arm A in the up-down direction indicated by the solid line L1 in the lower part of FIG. 4, a change width of the position in the up-down direction, a variation track or a change width of the position in the right-left direction, a variation track or a change width of the position in the front-back direction, and transition of the rotation angle around the shoulder joint. The index is not limited to an index indicated by the position and angle of the arm A, and may be an index indicated by the speed, acceleration, or the like of the arm A. The position data of the arm A can be acquired by integrating acceleration measurement data twice, and the speed data can be acquired by integrating acceleration measurement data once.

The rotation angle about each axis can be acquired by integrating the angular velocity. The data at each time point of the compound arm movement data 122 is stored in association with the first time stamp indicating the time point.

The CPU 11 receives, from the second device 20 (step S206), the torso movement data 123 (including the second time stamp) corresponding to the movement cycle T of the compound arm movement data 122 generated in step S205.

The CPU 11 determines whether or not the torso movement data 123 has been successfully received (step S207), and in a case where it is determined that the reception has been successful ("YES" in step S207), the CPU 11 determines whether or not it is a timing to register the torso movement history data 125 corresponding to the section (step S208). The timing is determined such that the torso movement history data 125 is registered at least once in each section. For example, in a case where the section identified in step S101 is different from the section identified in the previous step S101 (that is, in a case where the current section is switched), it may be determined that it is the timing to register the torso movement history data 125.

In a case where it is determined that it is the timing to register the torso movement history data 125 corresponding to the section ("YES" in step S208), the CPU 11 registers (stores) the torso movement data 123 received in step S206 into the memory 12 as the torso movement history data 125 in association with the current section (step S209). Note that, in a case where the torso movement history data 125 corresponding to the current section has already been stored in the memory 12, the acquired torso movement data 123 may be overwritten on the existing torso movement history data 125, or the existing torso movement history data 125 may be held without being overwritten. Alternatively, the torso movement history data 125 may be newly generated based on the existing torso movement history data 125 stored in association with the current section and the torso movement data 123 acquired in step S206. The torso movement history data 125 newly generated may be, for example, data of a representative value (for example, average value) of the value of the existing torso movement history data 125 and the value of the acquired torso movement data 123.

In a case where step S209 ends, or in a case where it is determined in step S208 that it is not the timing to register the torso movement history data 125 corresponding to the section ("NO" in step S208), the CPU 11 generates arm movement data 124 related to the single movement state based on the difference between the compound arm movement data 122 generated in step S205 and the torso movement data 123 acquired in step S206 for each of the up-down direction, the right-left direction, and the front and back direction (step S210). Here, with reference to the first time stamp of the compound arm movement data 122 and the second time stamp of the torso movement data 123, the CPU 11 calculates the difference between data at corresponding timings among the compound arm movement data 122 and the torso movement data 123, and generates the arm movement data 124. For example, in a case where the torso movement data 123 includes data indicating variations in the height of the waist illustrated in the middle part of FIG. 4 and the compound arm movement data 122 includes data indicating variations in the height of the wrist in the compound movement state indicated by the solid line L1 in the lower part of FIG. 4, the arm movement data 124 including data (data indicated by the broken line L2 and indicating variation in the height of the wrist in the single movement state) obtained by subtracting the height of the waist at each time point of the torso movement data 123 from the height of the wrist at each time point of the compound arm movement data 122 is generated. In a case where the compound arm movement data 122 includes data related to a plurality of mutually different indices indicating the compound movement state of the arm A, and the torso movement data 123 includes data related to a plurality of mutually different indices indicating the movement state of the torso B, for each index, data indicating the single movement state of the arm A may be generated based on the difference between the compound arm movement data 122 and the torso movement data 123, and the arm movement data 124 including the data may be generated. Here, examples of the plurality of mutually different indices indicating the compound movement state of the arm A include a variation track or a change width of the arm A in the up-down direction, a variation track or a change width of the position in the right-left direction, a variation track or a change width of the position in the front-back direction, transition of the rotation angle around the shoulder joint, transition of the speed change of the arm A, and transition of the acceleration of the arm A. Examples of the plurality of different indices indicating the movement state of the torso B include a variation track or a change width of the position of the torso B in the up-down direction, a variation track or a change width of the position of the torso B in the right-left direction, transition of the rotation angle around the trunk, transition of the inclination angle of the trunk from the vertical direction, transition of the speed change of the torso B, and transition of the acceleration change of the torso B.

In a case where it is determined in step S207 that the reception of the torso movement data 123 has failed ("NO" in step S207), the CPU 11 determines whether or not pairing with the second device 20 is ongoing (that is, whether or not communication connection is on) (step S211). In a case where it is determined that pairing is ongoing ("YES" in step S211), the CPU 11 returns the processing to step S206 and attempts to receive the torso movement data 123 again.

In a case where it is determined that pairing with the second device 20 is not ongoing (communication connection is off) ("NO" in step S211), the CPU 11 determines whether or not the torso movement history data 125 corresponding to the current section is registered in the memory 12 (step S212). In a case where it is determined that the torso movement history data 125 corresponding to the current section is registered in the memory 12 ("YES" in step S212), the CPU 11 acquires the torso movement history data 125 corresponding to the current section from the memory 12 (step S213). On the other hand, in a case where it is determined that the torso movement history data 125 corresponding to the current section is not registered in the memory 12 ("NO" in step S212), the CPU 11 acquires, from the memory 12 (step S214), the torso movement history data 125 corresponding to the final section (in the example of FIG. 6, the section S3). Note that, in a case where step S209 has not been executed in the past and the torso movement history data 125 has not been stored in the memory 12, the CPU 11 acquires predetermined torso movement data (torso movement data of predetermined value) from the memory 12 as the torso movement history data 125.

When step S213 or step S214 ends, the CPU 11 generates the arm movement data 124 related to the single movement state based on the difference between the compound arm movement data 122 generated in step S205 and the torso movement history data 125 acquired in step S213 or step S214 for each of the up-down direction, the right-left direction, and the front-back direction (step S215). Here, the time indicated by the first time stamp of the compound arm movement data 122 is different from the time indicated by the second time stamp of the torso movement history data 125, but for example, the first time stamp and the second time stamp are only required to be compared by being converted into time stamps indicating the elapsed time from the start time point of the movement cycle T. The processing of step S215 is identical to the processing of step S210 except use of the torso movement history data 125 in place of the torso movement data 123.

Figure 5:
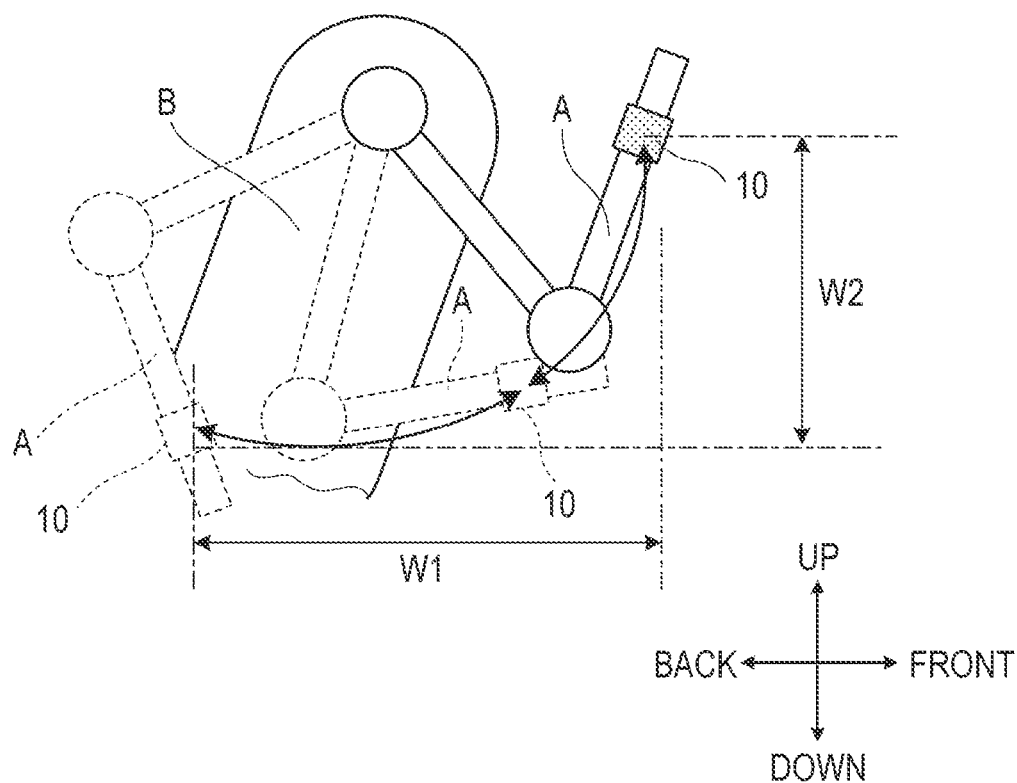
FIG. 5 is a diagram illustrating an example of an index of an arm movement state.

When the processing in step S210 or step S215 ends, the CPU 11 generates arm swing determination data based on the arm movement data 124 and performs a determination related to the arm swing state (step S216). The data item included in the arm swing determination data is appropriately set according to the item to be determined. For example, in a case where it is determined whether or not the swing width W2 of the arm A in the up-down direction illustrated in FIG. 5 is equal to or greater than a predetermined reference value, arm swing determination data indicating the swing width W2 of the arm A is generated based on the arm movement data 124. Then, it is determined whether or not the swing width W2 indicated by the arm swing determination data is equal to or greater than the reference value. Since the arm swing determination data generated here is generated based on the arm movement data 124 related to the single movement state of the arm A, it is possible to perform determination with respect to the accurate swing width W2 of the arm A on which the movement state of the torso B is not superimposed. Note that the target of the determination related to the arm swing state is not limited to the swing width W2 of the arm A in the up-down direction illustrated in FIG. 5, and may be a track of the arm swing in the up-down direction, the swing width W1 of the arm A or a track of the arm swing in the front-back direction, the swing width of the arm A or a track of the arm swing in the right-left direction, the speed of the arm A, the acceleration of the arm A, and the like. The determination related to the arm swing state is not limited to the determination as to whether or not the determination criterion is satisfied. For example, it may be determined under which evaluation level the swing widths W1, W2, and the like of the arm A fall among a plurality of evaluation levels, or may indicate numerical values themselves indicating the swing widths W1, W2, and the like of the arm A. The type of the arm swing form may be determined based on the track of the arm swing in each direction. Examples of the type of the arm swing form include a straight type arm swing form in which the arm A reciprocates relatively straight back and forth, and a rotation type arm swing form in which the arm A rotates in the arm swing action.

The CPU 11 causes the display unit 16 to display information including the determination result of the arm swing state (step S217). Here, in addition to the determination result itself, various types of additional information such as advice information indicating how to improve the arm swing form may be displayed. In addition to the display of information on the display unit 16 (or in place of the display), the determination result may be notified by another method. For example, the first device 10 may be provided with a vibration unit to notify the determination result by the vibration pattern, the magnitude of the vibration, and the like of the vibration unit. The first device 10 may be provided with an alarm sound output unit to notify the determination result by a pattern of the alarm sound or the like. The first device 10 may be provided with a light-emitting unit to notify the determination result by a light emission pattern or the like of the light-emitting unit.

The CPU 11 determines whether or not an instruction to end the detection of the movement state of the arm A has been made (step S218). The instruction may be an operation of instructing end of detection, an operation of instructing power-off, or the like by the user U. Alternatively, in a case where end of the movement of the user U is detected based on the detection result by the first sensor unit 13, it may be regarded that an instruction to end the detection is made. In a case where it is determined that the instruction to end the detection of the movement state of the arm A has not been made ("NO" in step S218), the CPU 11 returns the processing to step S201, and in a case where it is determined that the instruction to end the detection of the movement state of the arm A has been made ("YES" in step S218), the CPU ends the arm movement detection processing.

The torso movement detection processing illustrated in FIG. 7 and the arm movement detection processing illustrated in FIGS. 8 and 9 may be executed in each of a plurality of consecutive movement cycles T, or may be executed at a frequency of once for predetermined number of two or more of movement cycles T. The arm swing state may be determined based on a representative value (for example, an average value) of the plurality of arm movement data 124 generated in the plurality of times of arm movement detection processing. After the information including the determination result of the arm swing state is displayed on the display unit 16 in step S217 in FIG. 9, the arm swing is disturbed because the user U checks the display unit 16 of the first device 10 attached to the arm, and therefore the torso movement detection processing and the arm movement detection processing need not be executed during this period.

In the arm movement detection processing, steps S210, S215, S216, and S217 in FIG. 9 need not be necessarily executed during the movement of the user, and may be executed after the end of the movement. In the second device 20, although the measurement data is acquired and the torso movement data 123 is generated by the second sensor unit 23, in a case where pairing with the first device 10 has not been established and the torso movement data 123 cannot be transmitted to the first device 10 ("NO" in step S105 in FIG. 7), the torso movement data 123 may be transmitted to the first device 10 when pairing is established thereafter. In this case, steps S210, S216, and S217 in FIG. 9 may be executed when a smartphone 10 receives the transmitted torso movement data 123.

Steps S210 and S215 in FIG. 9 may be executed during the movement, and the processing related to the determination of the arm swing state in steps S216 and S217 may be executed after the movement (for example, for post hoc analysis).

Modification

The first device 10 may be attached to the leg (for example, the ankle or the thigh) of the user U. In a case where the first device 10 is attached to the leg, the first device 10 acquires compound leg movement data (first information) related to the compound movement state (first state) of the leg on which the movement state of the torso B is superimposed. Also in this case, by the processing similar to that in the above-described embodiment, leg movement data (third information) related to the single movement state of the leg with reference to the torso B can be generated based on the difference between the compound leg movement data and the torso movement data 123. By attaching the first device 10 on each of the arm and the leg, it is also possible to identify the single movement state of the arm and the single movement state of the leg.

Effects

As described above, the first device 10 as the information processing device according to the present embodiment includes the at least one CPU 11 as a processor. The CPU 11 acquires the compound arm movement data 122 (first information) related to the compound movement state (first movement state) of at least one of the arm and the leg of the user U on which the movement state of the torso of the user U performing the movement is superimposed, acquires the torso movement data 123 (second information) related to the movement state (second movement state) of the torso of the user U performing the movement, and generates the arm movement data 124 (third information) related to the single movement state (third movement state) of at least one of the arm and the leg of the user U based on the compound arm movement data 122 and the torso movement data 123 (or the torso movement history data 125).

This makes it possible to more accurately identify the single movement state of at least one of the arm and the leg as compared with a prior art in which the compound movement state of the arm or the leg is identified using only the electronic apparatus attached to the arm. Since the movement state of the torso of the user U can be subtracted from the compound movement state of the arm, the single movement state of the arm can be identified with high accuracy as compared with the method of subtracting the movement state of the torso of others. Therefore, for example, it is possible to more accurately analyze the arm swing form and the leg swing form at the time of running, and it is possible to more effectively improve the form.

The compound arm movement data 122 may be data related to the compound movement state of at least one of the arm and the leg of the user U in the first period, and the torso movement data 123 may be data related to the movement state of the torso of the user U in the first period. This makes it possible to subtract, from the compound movement state of the arm, the real-time torso movement state when the compound arm movement data 122 is acquired. Therefore, it is possible to identify the single movement state of the arm more accurately.

The compound arm movement data 122 is generated based on the detection result of the compound movement state at each of the plurality of first detection timings, and the torso movement data 123 is generated based on the detection result of the movement state of the torso at each of the plurality of second detection timings synchronized with the plurality of first detection timings. This makes it possible to subtract, from the compound movement state of the arm, the movement state of the torso at each time point during the movement, and therefore it is possible to identify the single movement state of the arm more accurately.

The compound arm movement data 122 may be data related to the compound movement state of at least one of the arm and the leg of the user U in the first period, and the torso movement history data 125 may be data related to the movement state of the torso of the user U in the second period prior to the first period. Also this makes it possible to subtract the movement state of the torso of the user U from the compound movement state of the arm, and therefore it is possible to identify the single movement state of the arm more accurately as compared with a prior art in which the compound movement state of the arm or the leg is identified using only the electronic apparatus attached to the arm. Since the past torso movement history data 125 is used, it is not necessary to identify the movement state of the torso in real time and generate the torso movement data 123 when acquiring the compound arm movement data 122. For this reason, even in a state where only the first device 10 is attached, it is possible to identify the single movement state of the arm. Even in a case where the communication connection between the first device 10 and the second device 20 is disconnected and the torso movement data 123 cannot be acquired from the second device 20, the single movement state of the arm can be identified.

The movement is accompanied by travel of the user U, and the CPU 11 acquires the torso movement history data 125 related to the movement state of the torso in each of the plurality of sections obtained by dividing the travel path after the travel is started in the second period, identifies as to which section of the plurality of sections the travel distance of the user U after the travel is started in the first period belongs to, and generates the arm movement data 124 based on the compound arm movement data 122 and the torso movement history data 125 corresponding to the identified section. Due to this, even in a case where the running form (the movement state of the torso) changes due to fatigue or the like according to the running distance, the movement state of the torso reflecting the change can be subtracted from the compound movement state of the arm. Therefore, it is possible to identify the single movement state of the arm more accurately.

In a case where the travel distance of the user U in the first period is longer than the entirety of the plurality of sections, the CPU 11 generates the arm movement data 124 based on the compound arm movement data 122 and the torso movement history data 125 corresponding to the final section among the plurality of sections. This makes it possible to generate the arm movement data 124 using the torso movement history data 125 of the movement state closest to the movement state of the torso at the current travel distance. Therefore, even in a case where there is no section corresponding to the current travel distance, the single movement state of the arm can be accurately identified within a possible range.

At least one of the arm and the leg of the user U performing the movement performs a cyclic action, the compound arm movement data 122 is information related to the compound movement state in one movement cycle T (one cycle) of the cyclic action, and the torso movement data 123 is information related to the movement state of the torso B in the movement cycle T. This makes it possible to identify the single movement state of the arm in the movement cycle T.

The first device 10 is used by being attached to the arm or the leg of the user U, and includes the first sensor unit 13 as a detection unit configured to detect the movement state of the device, and the CPU 11 generates the compound arm movement data 122 based on the detection result of the first sensor unit 13. Due to this, the first device 10 attached to the arm can generate the arm movement data 124, and identify the single movement state of the arm.

The information processing system 1 according to the present embodiment includes the first device 10 having the first sensor unit 13 that is attached to at least one of the arm and the leg of the user U and detects the movement state of the device, the second device 20 having the second sensor unit 23 that is attached to the torso of the user U and detects the movement state of the device, and the at least one CPU 11 as a processor. The CPU 11 acquires the compound arm movement data 122 generated based on the detection result of the first sensor unit 13 and related to the compound movement state of at least one of the arm and the leg of the user U on which the movement state of the torso of the user U performing the movement is superimposed, acquires the torso movement data 123 generated based on the detection result of the second sensor unit 23 and related to the movement state of the torso of the user U performing the movement, and generates the arm movement data 124 related to the single movement state of at least one of the arm and the leg of the user U based on the compound arm movement data 122 and the torso movement data 123. This makes it possible to more accurately identify the single movement state of at least one of the arm and the leg as compared with a prior art in which the compound movement state of the arm or the leg is identified using only the electronic apparatus attached to the arm.

The program 121 according to the present embodiment causes the CPU 11 as a computer to implement the function of acquiring the compound arm movement data 122 related to the compound movement state of at least one of the arm and the leg of the user U on which the movement state of the torso of the user U performing the movement is superimposed, the function of acquiring the torso movement data 123 related to the movement state of the torso of the user U performing the movement, and the function of generating the arm movement data 124 related to the single movement state of at least one of the arm and the leg of the user U based on the compound arm movement data 122 and the torso movement data 123. This makes it possible to more accurately identify the single movement state of at least one of the arm and the leg as compared with a prior art in which the compound movement state of the arm or the leg is identified using only the electronic apparatus attached to the arm.

The information processing method by the CPU 11 as a computer according to the present embodiment includes the steps of: acquiring the compound arm movement data 122 related to the compound movement state of at least one of the arm and the leg of the user U on which the movement state of the torso of the user U performing the movement is superimposed; acquiring the compound arm movement data 122 related to the movement state of the torso of the user U performing the movement; and generating the arm movement data 124 related to the single movement state of at least one of the arm and the leg of the user U based on the compound arm movement data 122 and the torso movement data 123. This makes it possible to more accurately identify the single movement state of at least one of the arm and the leg as compared with a prior art in which the compound movement state of the arm or the leg is identified using only the electronic apparatus attached to the arm.

<Others>

Note that the description in the above embodiment is an example of the information processing device, the information processing system, and the information processing method according to the present invention, and the present invention is not limited to this.

For example, in the above embodiment, the arm movement data 124 as the third information is generated based on the difference between the compound arm movement data 122 and the torso movement data 123 (or the torso movement history data 125), but the third information may be generated by a method not using the difference between the compound arm movement data 122 and the torso movement data 123 (or the torso movement history data 125). For example, the compound arm movement data 122 and the torso movement data 123 (or the torso movement history data 125) may be input to a discriminator generated by supervised machine learning, and the third information related to the single movement state of the arm may be output from the discriminator. The machine learning of the discriminator in this case is performed with the compound arm movement data 122 and the torso movement data 123 (or the torso movement history data 125) as input, and the arm movement data acquired based on an image of the arm during the movement captured by a camera as training data. The third information in this case may be a determination result of the arm swing state (evaluation data related to the evaluation level of arm swing), for example. That is, the determination result of the arm swing state as the third information may be directly acquired from the compound arm movement data 122 and the torso movement data 123 (or the torso movement history data 125) without calculating the difference (not through the arm movement data 124) using the discriminator generated by the machine learning. The discriminator is not particularly limited, but may be, for example, a neural network, a support vector machine, or the like.

The first device 10 may include a plurality of processors (for example, a plurality of CPUs), and the plurality of processors may execute a plurality of processing executed by the CPU 11 of the first device 10 of the above-described embodiment. In this case, the plurality of processors correspond to "at least one processor". The second device 20 may include a plurality of processors (for example, a plurality of CPUs), and the plurality of processors may execute a plurality of processing executed by the CPU 21 of the second device 20 of the above-described embodiment. In these cases, the plurality of processors may be involved in common processing, or the plurality of processors may independently execute different processing in parallel.

An external apparatus (for example, a smartphone, a personal computer (PC), or the like) separate from the first device 10 and the second device 20 may acquire the compound arm movement data 122 from the first device 10, acquire the torso movement data 123 from the second device 20, and generate the arm movement data 124 based on the compound arm movement data 122 and the torso movement data 123 that have been acquired. In this case, the external apparatus corresponds to the "information processing device". Such external apparatus can perform ex-post analysis on the movement state of the user U based on the arm movement data 124.

The second device 20 may receive the compound arm movement data 122 from the first device 10, and the CPU 21 of the second device 20 may generate the arm movement data 124 based on the compound arm movement data 122 and the torso movement data 123. In this case, the second device 20 corresponds to the "information processing device".

The first sensor unit 13 is not limited to the configuration exemplified in the above embodiment as long as it can detect the movement state of the first device 10. The second sensor unit 23 is not limited to the configuration exemplified in the above embodiment as long as it can detect the movement state of the second device 20. For example, in a case where the triaxial geomagnetic sensor 133 (233) is included, the magnitude of the angular velocity about each axis may be detected using the triaxial geomagnetic sensor 133 (233) as a magnetic gyro in place of the triaxial angular velocity sensor.

In the above-described embodiment, the example of generating the compound arm movement data 122, the torso movement data 123, and the arm movement data 124 based on the measurement data for the movement cycle T has been described, but the present invention is not limited to this, and the compound arm movement data 122, the torso movement data 123, and the arm movement data 124 may be generated based on the measurement data corresponding to a discretionary period.

In the above description, an example in which the memory 12 is used as the computer-readable medium of the program according to the present invention has been disclosed, but the present invention is not limited to this example. As another computer-readable medium, an information recording medium such as an HDD, an SSD, a flash memory, or a CD-ROM can be applied. A carrier wave is also applied to the present invention as a medium for providing data of the program according to the present invention via a communication line.

The detailed configurations and the detailed actions of the components of the first device 10 and the second device 20 in the above embodiment can be appropriately changed without departing from the gist of the present invention.

Although an embodiment of the present invention has been described, the scope of the present invention is not limited to the above-described embodiment, and includes the scope of the invention described in the claims and the equivalent scope thereof.

What is claimed is:

1. An information processing device comprising:
   at least one processor,
   wherein the at least one processor:
   acquires first information related to a first movement state including a movement state of at least one of an arm and a leg of a user performing a movement and a movement state of a torso of the user in a first period from a first device attached to an arm part of the user, acquires second information related to a second movement state of the torso of the user performing the movement in a second period prior to the first period from a second device attached to the torso of the user, and generates third information related to a third movement state of the at least one of the arm and the leg of the user based on the first information and the second information, wherein the movement involves travel of the user, and the at least one processor acquires the second information related to the second movement state in each of a plurality of sections obtained by dividing a travel path after the travel is started in the second period, and identifies which section of the plurality of sections a travel distance of the user after the travel is started in the first period belongs to, and generates the third information based on the first information and the second information corresponding to the identified section.

2. The information processing device according to claim 1, wherein the first information is generated based on a detection result of the first movement state at each of a plurality of first detection timings, and the second information is generated based on a detection result of the second movement state at each of a plurality of second detection timings synchronized with the plurality of first detection timings.

3. The information processing device according to claim 1, wherein the at least one processor generates the third information based on the first information and the second information corresponding to a final section of the plurality of sections in a case where a travel distance of the user in the first period is longer than an entirety of the plurality of sections.

4. The information processing device according to claim 1, wherein the at least one of the arm and the leg of the user performing the movement performs a cyclic action, the first information is information related to the first movement state in one cycle of the cyclic action, and the second information is information related to the second movement state in the one cycle.

5. The information processing device according to claim 1, wherein the information processing device comprises the first device, the first device includes a detection unit configured to detect a movement state of the first device, and the at least one processor generates the first information based on a detection result of the detection unit.

6. An information processing system comprising:

a first device comprising a first detection unit is used by being attached to at least one of an arm and a leg of a user, and configured to detect a movement state of the first device;

a second device comprising a second detection unit attached to a torso of the user, and configured to detect a movement state of the second device; and at least one processor, wherein the at least one processor acquires first information related to a first movement state including a movement state of the at least one of the arm and the leg of the user and a movement state of the torso of the user performing a movement, the first information being generated based on a detection result of the first detection unit in a first period, acquires second information related to a second movement state of the torso of the user performing the movement, the second information being generated based on a detection result of the second detection unit in a second period prior to the first period, and generates third information related to a third movement state of the at least one of the arm and the leg of the user based on the first information and the second information, wherein the movement involves travel of the user, and the at least one processor acquires the second information related to the second movement state in each of a plurality of sections obtained by dividing a travel path after the travel is started in the second period, and identifies which section of the plurality of sections a travel distance of the user after the travel is started in the first period belongs to, and generates the third information based on the first information and the second information corresponding to the identified section.

7. An information processing method by a computer, the method comprising:

acquiring first information related to a first movement state including a movement state of at least one of an arm and a leg of a user performing a movement and a movement state of a torso of the user in a first period from a first device attached to an arm part of the user;

acquiring second information related to a second movement state of the torso of the user performing the movement in a second period prior to the first period from a second device attached to the torso of the user; and generating third information related to a third movement state of the at least one of the arm and the leg of the user based on the first information and the second information, wherein:

the movement involves travel of the user, and the method further comprises:

acquiring the second information related to the second movement state in each of a plurality of sections obtained by dividing a travel path after the travel is started in the second period, and identifying which section of the plurality of sections a travel distance of the user after the travel is started in the first period belongs to, and generating the third information based on the first information and the second information corresponding to the identified section.

* * * * *